(12) United States Patent
Pitoniak

(10) Patent No.: US 6,857,839 B2
(45) Date of Patent: Feb. 22, 2005

(54) APPARATUS FOR LOADING AND UNLOADING A COMPONENT DETACHABLY MOUNTED ON A VEHICLE

(75) Inventor: James J. Pitoniak, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 74 days.

(21) Appl. No.: 10/374,187

(22) Filed: Feb. 26, 2003

(65) Prior Publication Data

US 2004/0165976 A1 Aug. 26, 2004

(51) Int. Cl.⁷ .............................................. B62D 43/02
(52) U.S. Cl. ...................... 414/462; 224/509; 414/463
(58) Field of Search ................................ 224/509, 462; 414/463, 464, 465, 466

(56) References Cited

U.S. PATENT DOCUMENTS 3,977,713 A * 8/1976 Guin ........................... 293/117
4,561,575 A * 12/1985 Jones ........................ 224/42.21

* cited by examiner

Primary Examiner—Janice L. Krizek
(74) Attorney, Agent, or Firm—Laura C. Hargitt

(57) ABSTRACT

An apparatus for storing and unloading a component such as a spare tire and wheel assembly mounted at a rear storage location on a vehicle includes a vehicle attachment arm having a first end releasably attached at a mounting location on the vehicle and a component attachment having a first end positioned adjacent the component storage location. The arms each have a second end attached to a connector member that permits the component attachment arm to be rotated between the component storage location and an unloaded position on the ground. The vehicle attachment arm is adjustable in length to move toward and away from the storage location. The component attachment arm is adjustable in length to move toward and away from the component storage location.

13 Claims, 3 Drawing Sheets

APPARATUS FOR LOADING AND UNLOADING A COMPONENT DETACHABLY MOUNTED ON A VEHICLE

BACKGROUND OF THE INVENTION

The present invention relates generally to an apparatus for detachably mounting a component on a vehicle and, in particular, to an apparatus for facilitating the loading and unloading of a component, such as a spare vehicle tire and wheel assembly, detachably mounted on a vehicle.

Many vehicles in the past carried components, such as a spare vehicle tire and wheel assembly, in the vehicle interior as a smaller "space saver" device physically smaller and lighter than the standard wheel and tire assembly. These spare tires allowed the owner to remove a flat tire and replace it with the smaller spare in order to have the standard tire repaired while still not occupying a large amount of interior volume when the spare is stowed on-board the vehicle.

As larger vehicles are produced, however, correspondingly larger tire and wheel assemblies are required: for these larger vehicles. Because of the larger tire and wheel assemblies, many of the larger vehicles carry an exterior rear mounted spare tire to maximize interior cargo room. The larger spare tires, however, are correspondingly heavier and have become increasingly difficult for the average vehicle owner to maneuver the spare tire safely between the ground and the rear mounting location of the vehicle.

It is desirable, therefore, to provide an apparatus for assisting a person attempting to maneuver a component, such as a spare vehicle tire and wheel assembly, between a rear portion of the vehicle and the ground.

SUMMARY OF THE INVENTION

The present invention concerns an apparatus that is adapted to be attached to a rear portion of a vehicle for facilitating the storing and unloading of a component. The apparatus includes a vehicle attachment arm having a first end that is adapted to be attached to a mounting location on a vehicle and a second end. The apparatus also includes a component attachment arm having a first end that is adapted to be attached to a mounting location on a component and a second end. The apparatus also includes a connector member having a first portion and a second portion. The first portion of the connector member is adapted to be connected to the second end of said vehicle attachment arm and the second portion of the connector member is adapted to be connected to the second end of the component attachment arm. The connector member is operable to move the component between a stored position on the vehicle and an unloaded position on the ground.

Preferably, the component is a vehicle spare tire and wheel assembly and the apparatus is used as a spare tire storage device. Alternatively, the component is a bicycle and the apparatus is utilized as a bicycle rack. Preferably, the attachment point on the vehicle is a hitch receiver located on a rear portion of the vehicle. The hitch receiver has become a generally standard item on larger vehicles such as pickup trucks and sport utility vehicles and its size has become standardized as well to allow for a plurality of different hitches to be attached thereto. The apparatus, therefore, can be attached to a number of different vehicles without extensive modification.

The connector member preferably includes a planetary gear assembly having a ring gear is that disposed radially outwardly of a plurality of planetary gears and meshes with each of the planetary gears. The ring gear is coupled to the second portion of the connector member for rotating the component attachment arm. A sun gear that is disposed radially inwardly of the planetary gears also meshes with each of a plurality of planetary gears. The sun gear is preferably adapted to receive a wrench for applying a torque thereto for lowering the component from the vehicle to the ground.

The apparatus in accordance with the present invention advantageously allows the user of the vehicle to maneuver heavy and/or awkward items, such as a spare vehicle tire and wheel assembly that are attached to the vehicle, between the vehicle attachment point and the ground.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
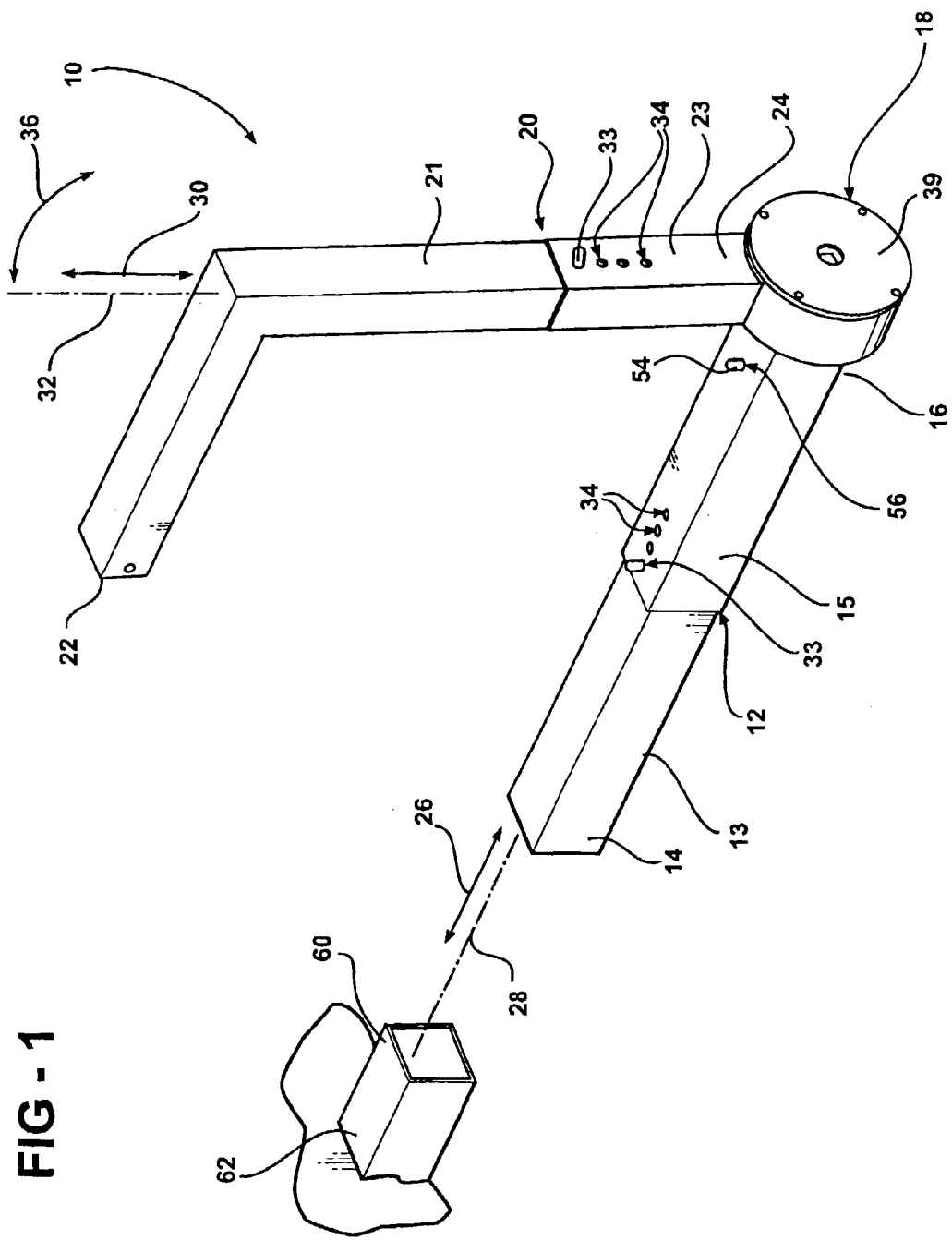
FIG. 1 is a perspective view of an apparatus for facilitating the storing and unloading of a component in accordance with the present invention.

Referring now to FIG. 1, an apparatus in accordance with the present invention is indicated generally at 10. The apparatus 10 is adapted to be attached to a rear portion of a vehicle 60 for facilitating the storing and unloading of a component, such as a vehicle spare tire and wheel assembly (not shown). The apparatus 10 includes a vehicle attachment arm 12 having an inner member 13 with a first end 14 and an outer member 15 with a second end 16. The first end 14 of the vehicle attachment arm 12 is adapted to be attached to a mounting location 62 on the vehicle 60. The vehicle attachment arm 12 is preferably constructed of steel or aluminum square tubing with the inner member 13 telescoping into an interior of the outer member 15. Alternatively, the vehicle attachment arm 12 is constructed of an alternate material having similar material strength properties or is formed in an alternate profile that is adapted to be attached to the mounting location 62 on the vehicle 60. The second end 16 of the vehicle attachment arm 12 is attached to a first portion of a connector member 18.

A component attachment arm 20 includes a generally L-shaped inner member 21 with a first end 22 and an outer member 23 with a second end 24. The first end 22 is adapted to be attached to a mounting location on the component, such as the hub of a spare tire and wheel assembly. The second end 24 is attached to a second portion of the connector member 18. The component attachment arm 20 is preferably constructed of steel or aluminum square tubing with the inner member 21 telescoping into an interior of the outer member 23. Alternatively, the component attachment arm 20 is constructed of an alternate material having similar material strength properties or is formed in an alternate profile that is adapted to be attached to the mounting location on the component.

The vehicle attachment arm 12 is operable to be adjusted in an axial generally horizontal direction indicated by an arrow 26 along a longitudinal axis 28 thereof. The component attachment arm 20, shown in a component storage position, is operable to be adjusted in an axial generally vertical direction indicated by an arrow 30 along a longitudinal axis 32 thereof. Preferably, the vehicle attachment arm 12 and the component attachment arm 20 can be locked in a plurality of axial positions by spring-loaded locking pins 33 on the inner members 13 and 21 that cooperate with a plurality of axially spaced apertures 34 formed in the outer member 15 of the vehicle attachment arm 12 and the outer member 23 of the component attachment arm 20. Alternatively, the vehicle attachment arm 12 and the component attachment arm 20 may be locked in a plurality of axial positions by any suitable locking means. Preferably, the component attachment arm 20 includes spring-loading locking pins 33 located on opposite sides of the inner member 21 so that the first end 22 of the component attachment arm 20 may face in opposite directions, discussed in more detail below, when the component attachment arm 20 is attached to the connector member 18. As discussed below, the connector member 18 permits rotation of the component attachment arm 20 about the longitudinal axis 28 in both directions as indicated by a double headed arrow 36. By virtue of their axial adjustability, the vehicle attachment arm 12 and the component attachment arm 20 are operable to allow the apparatus 10 to be used with any number of vehicles and components.

Figure 2:
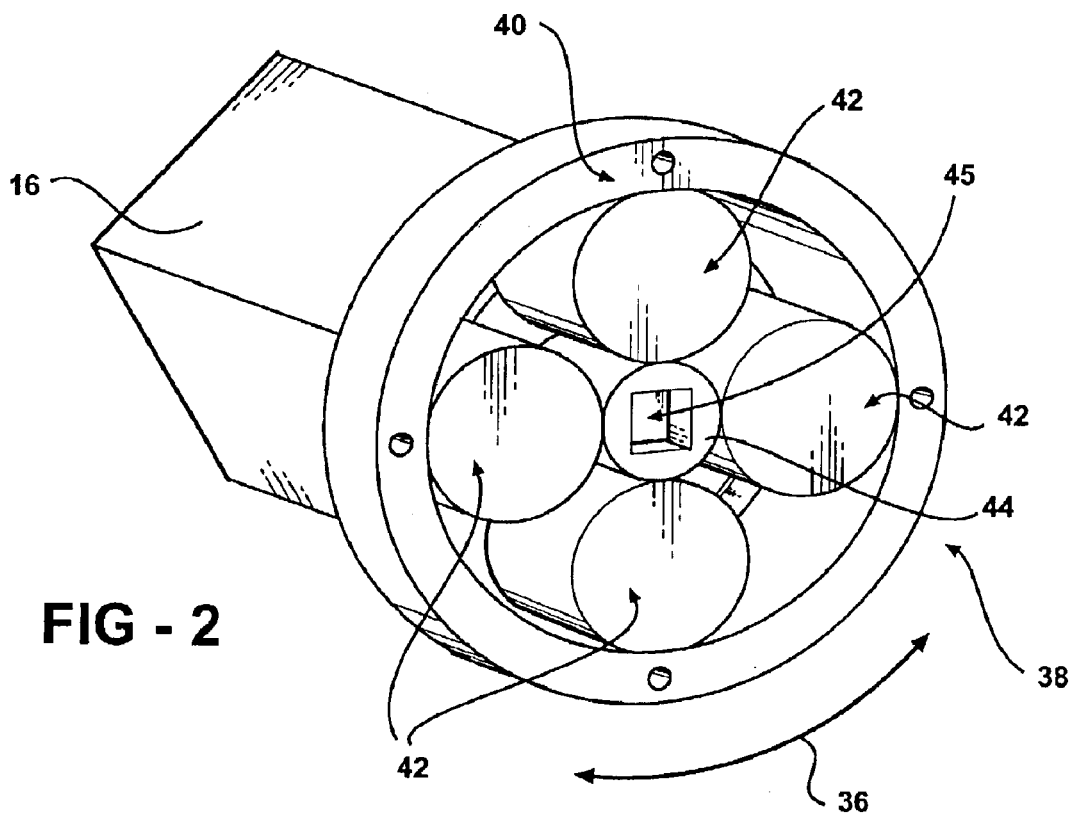
FIG. 2 is a front perspective schematic view of a planetary gear assembly of the apparatus of FIG. 1.

Referring now to FIG. 2, the connector member 18 is shown in detail. The connector member 18 includes a planetary gear assembly, indicated generally at 38. The planetary gear assembly 38 includes a ring gear 40 having a plurality of teeth (not shown) on an interior surface thereof that mesh with corresponding teeth (not shown) on respective exterior peripheral surfaces of a plurality of planetary gears 42 disposed radially interior therein. The ring gear 40 is attached to the second end 24 of the component attachment arm 20 shown in FIG. 1. The ring gear 40, therefore, is a part of the second portion of the connector member 18. The teeth of the planetary gears 42 also mesh with a plurality of teeth (not shown) on an exterior peripheral surface of a sun gear 44 disposed radially interior therein. The sun gear 44 is rotatably mounted in the connector member 18 and includes an aperture 45 formed in an outwardly facing surface thereof for receiving a wrench (not shown) or the like for turning the sun gear when the apparatus 10 is operated, discussed in more detail below. A cover plate 39, best seen in FIG. 1, is attached to an outwardly facing surface of the ring gear 40, encloses the interior of the planetary gear assembly 38 and protects the meshing gear teeth from foreign object damage.

Figure 3:
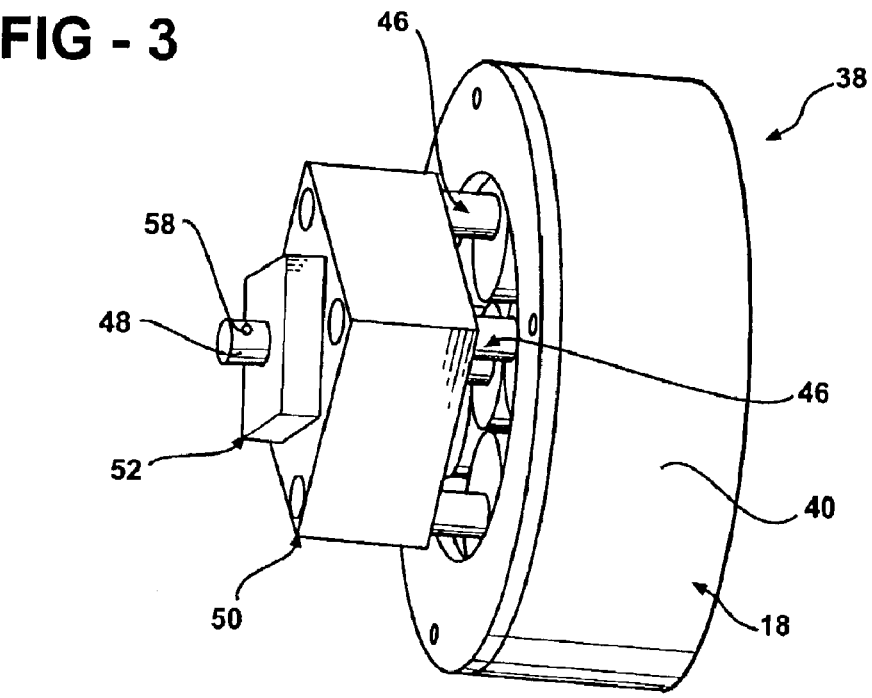
FIG. 3 is a side perspective schematic view of the planetary gear assembly of FIG. 2.

Referring now to FIG. 3, each of the planetary gears 42 is rotatably mounted on a separate shaft 46. The shafts 46 extend rearwardly from the planetary gears 42 generally parallel to one another. Another shaft 48 extends rearwardly from a rear surface of the sun gear 44 generally parallel to the shafts 46. A generally box-shaped receiver 50 mounts each of the planetary gear shafts 46, which shafts can be fixed in the receiver with the gears 42 rotating on the shafts, or the shafts can be rotatably mounted in the receiver with the gears fixed on the shafts. The receiver 50 is sized such that it is retained in the interior of the outer member 15 at the second end 16 of the vehicle attachment arm 12. The receiver 50, therefore, is a part of the first portion of the attachment member 18.

The sun gear shaft 48 extends through a central portion of the receiver 50 and has a free end extending from a rear surface of the receiver through a central aperture in a clutch 52. The clutch 52 is attached to the sun gear shaft 48 with an interference fit and frictionally engages the rear surface of the receiver 50. Thus, a predetermined amount of torque must be applied to the sun gear 44 to overcome the predetermined frictional holding force applied by the clutch 52 and rotate the sun gear. The holding force can be selected to correspond with a desired maximum component load attached to the first end 22 of the inner member 21 with the component attachment arm 20 fully extended. A locking pin 54 (shown in FIG. 1) is releasably insertable into an aperture 56 (FIG. 1) formed in the second end 16 of the outer member 15 of the vehicle attachment arm 12 and an aperture 58 (FIG. 3) formed in the free end of the sun gear shaft 48 for preventing unintentional rotation of the component attachment arm 20. Alternatively, the apparatus 10 includes another suitable means for locking the arm 20 relative to the vehicle attachment arm 12.

In operation, the first end 14 of the vehicle attachment arm 12 is attached to the mounting location 62 on the rear portion of the vehicle 60. The vehicle mounting location 62 is preferably a trailer hitch receiver of the vehicle 60. The respective lengths of the vehicle attachment arm 12 and the component attachment arm 20 are adjusted so that the first end 22 of the component attachment arm 20 is adjacent a mounting location on the component, such as the center hole in the wheel of the spare wheel and tire assembly that is attached to a component mounting location (not shown) on the vehicle. The spare tire is attached to the first end 22 of the component attachment arm 20 and the vehicle attachment arm 12 is adjusted outwardly so that the spare tire will have a clear path to the ground in the loading/unloading direction 36. A wrench (not shown) is inserted into the aperture 45 in the sun gear 44 and a torque is provided to the wrench to begin rotating the sun gear 44. As the sun gear 44 rotates, the planetary gears 42 rotate, and the ring gear 40 rotates. Preferably, the gear ratio between the interconnected sun gear 44, planetary gears 42, and the ring gear 40 is at or near 20 to 1, to allow for an optimum mechanical advantage when applying a torque to the wrench. As the torque is applied to the sun gear 44, the holding force applied by the clutch 52 is overcome, the component attachment arm 20 moves in the loading/unloading direction 36 and lowers the spare tire towards the ground. After the spare tire has touched the ground, the spare tire is removed from the first end 22 of the component attachment arm 20, and the first end 14 of the vehicle attachment arm 12 is removed from the trailer hitch receiver. The apparatus 10 may also be used to assist in storing the component, such as a flat vehicle tire and wheel assembly, at the component mounting location on the vehicle 60 by attaching the first end 14 of the vehicle attachment arm 12 to the vehicle mounting location 62 and attaching the first end 22 of the component attachment arm to the component and reversing the steps outlined above. The wrench is inserted into the aperture 45 and a torque is provided to rotate the component attachment arm 20 in the loading/unloading direction 36 such that the first end 22 of the component attachment arm 20 is moved adjacent the component mounting location on the vehicle 60.

Figure 4:
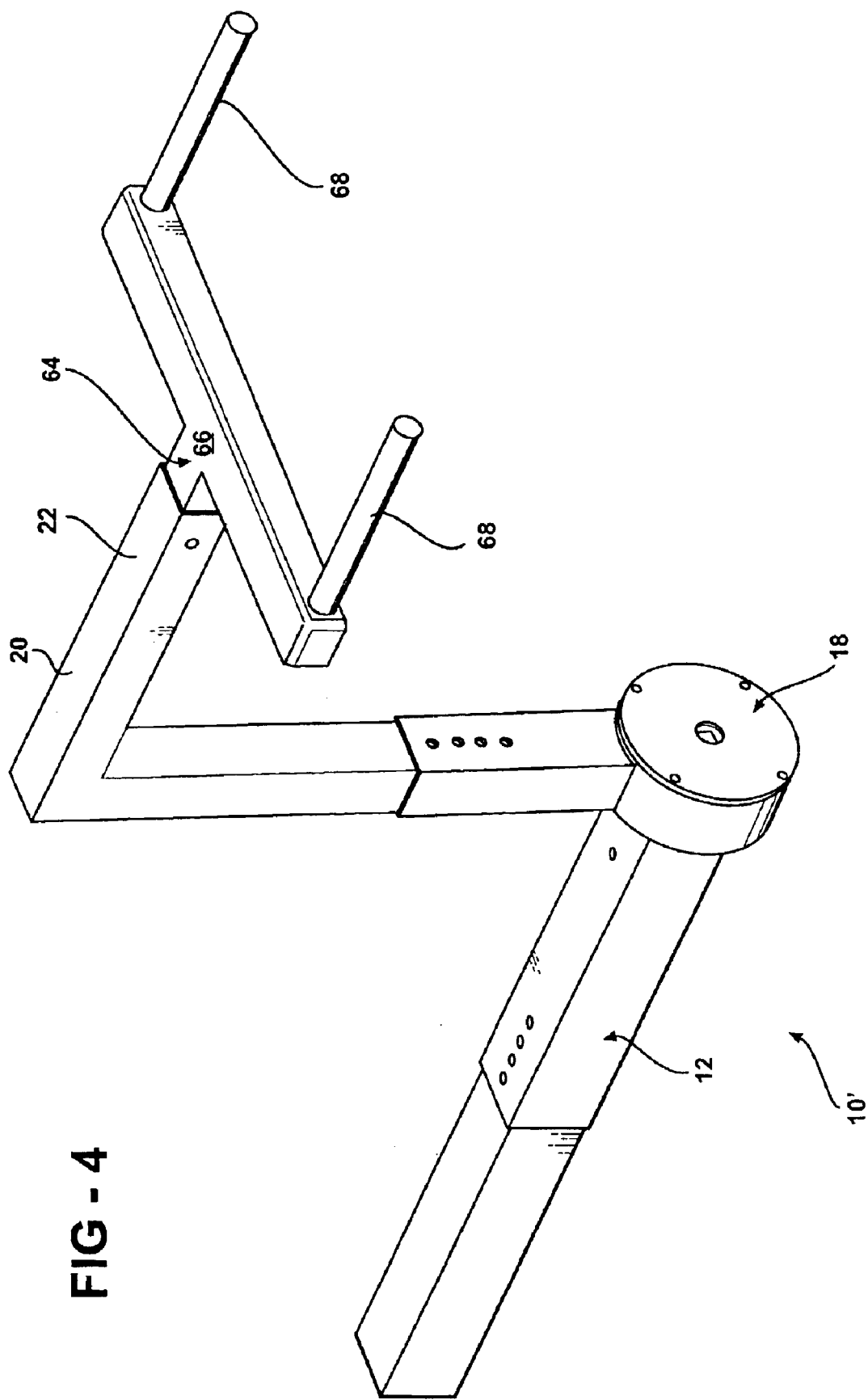
FIG. 4 is a perspective view of an alternative embodiment of an apparatus for facilitating the storing and unloading of a component in accordance with the present invention.

Referring now to FIG. 4, an alternative embodiment of an apparatus for facilitating the storing and unloading of a component is indicated generally at 10'. The apparatus 10' includes the vehicle attachment arm 12 and the component attachment arm 20 extending outwardly from the connector portion 18. The first end 22 of the component attachment arm 20 faces an opposite direction as in FIG. 1. The component attachment arm 20 includes a component attachment bracket 64 attached to the first end 22 thereof for attaching a component (not shown) thereto. The component is preferably a bicycle or the like and the component attachment bracket 64 includes a cross support member 66 and a pair of attachment rods 68 extending therefrom for facilitating the attachment of the bicycles wheels or frame (not shown) thereto. Alternatively, the component attachment bracket 64 is shaped or configured to attach to any number of components including, but not limited to, skis, surfboards, food cooler chests, or any component where it is advantageous to provide a mechanical advantage for moving the component from the vehicle to the ground.

In operation, the apparatus 10' is operated in the same manner as the apparatus 10 so that the bicycle or other component is lowered to the ground and later raised to a mounting location on the vehicle.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus adapted to be attached to a rear portion of a vehicle for facilitating the storing and unloading of a component, said apparatus comprising:
   a vehicle attachment arm having a first end adapted to be attached to a mounting location on a vehicle and a second end;
   a component attachment arm having a first end adapted to be attached to a mounting location on a component and a second end;
   a connector member having a first portion and a second portion, said first portion of said connector member connected to said second end of said vehicle attachment arm, said second portion of said connector member connected to said second end of said component attachment arm, said connector member being operable to move said component attachment arm relative to said vehicle attachment arm whereby when the component attachment arm is attached to the component, the component is moved between a stored position on the vehicle and an unloaded position on the ground;
   wherein said connector member includes a planetary gear assembly having a ring gear meshed with a plurality of planetary gears disposed radially interiorly of said ring gear, a sun gear disposed radially interiorly of said planetary gears and meshed with said planetary gears, and a receiver member on which said planetary gears and said sun gear are mounted, and wherein said first portion of said connector member includes said receiver member and said second portion of said connector member includes said ring gear.

2. The apparatus according to claim 1 wherein said sun gear includes an aperture adapted to receive a wrench for applying a torque to rotate said sun gear thereby moving said component attachment arm between a generally vertical stored position and a generally horizontal unloaded position.

3. The apparatus according to claim 1 including a separate planetary gear shaft extending from each of said planetary gears to said receiver member and a sun gear shaft extending from said sun gear and through said receiver.

4. The apparatus according to claim 3 wherein said planetary gear assembly includes a clutch attached to said sun gear shaft and frictionally engaging an outer surface of said receiver member.

5. An apparatus adapted to be attached to a rear portion of a vehicle for facilitating the loading and unloading of a component, said apparatus comprising:
   a planetary gear assembly having a ring gear meshed with a plurality of planetary gears disposed radially interiorly of said ring gear, a sun gear disposed radially interiorly of said planetary gears and meshed with said planetary gears, and a receiver member on which said planetary gears and said sun gear are mounted;
   a vehicle attachment arm having a first end adapted to be attached to a mounting location on the vehicle and a second end attached to said receiver member;
   a component attachment arm having a first end adapted to be attached to the component and a second end attached to said ring gear;
   whereby when said vehicle attachment arm is attached to the vehicle mounting location and said component attachment arm is attached to the component, and when a torque is applied to said sun gear, said sun gear rotates said ring gear to move said component attachment arm and the component between a stored position on the vehicle and an unloaded position with the component on the ground.

6. The apparatus according to claim 5 including means for preventing movement of said component attachment arm relative to said vehicle attachment arm.

7. The apparatus according to claim 5 including means for adjusting a length of said vehicle attachment arm.

8. The apparatus according to claim 5 including means for adjusting a length of said component attachment arm.

9. The apparatus according to claim 5 wherein said sun gear includes an aperture adapted to receive a wrench for applying a torque to rotate said sun gear thereby moving said component attachment arm between a generally vertical stored position and a generally horizontal unloaded position.

10. The apparatus according to claim 5 wherein said vehicle mounting location is a trailer hitch receiver.

11. The apparatus according to claim 5 including a component attachment bracket attached to said first end of said component attachment arm, said component attachment bracket being configured to attach to one of a spare tire and wheel assembly and a bicycle.

12. The apparatus according to claim 5 including a separate planetary gear shaft extending from each of said planetary gears to said receiver member and a sun gear shaft extending from said sun gear and through said receiver.

13. The apparatus according to claim 12 wherein said planetary gear assembly includes a clutch attached to said sun gear shaft and frictionally engaging an outer surface of said receiver.

* * * * *